No. 793,264. PATENTED JUNE 27, 1905.
E. W. BAIRD.
AUTOMATIC LUBRICATOR.
APPLICATION FILED NOV. 30, 1904.
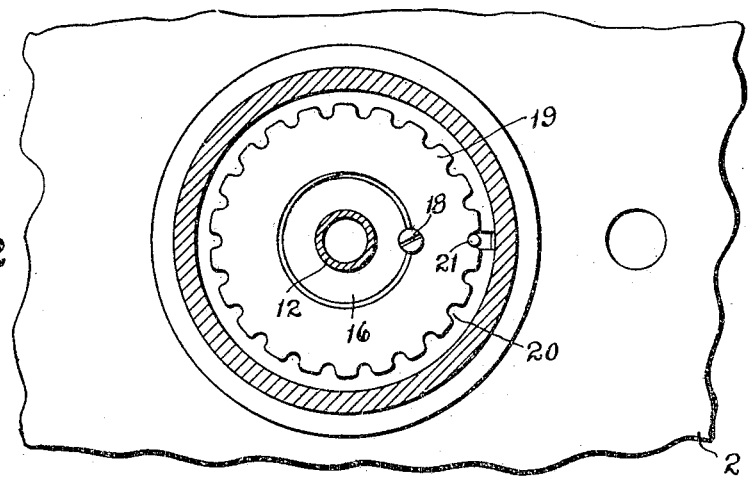
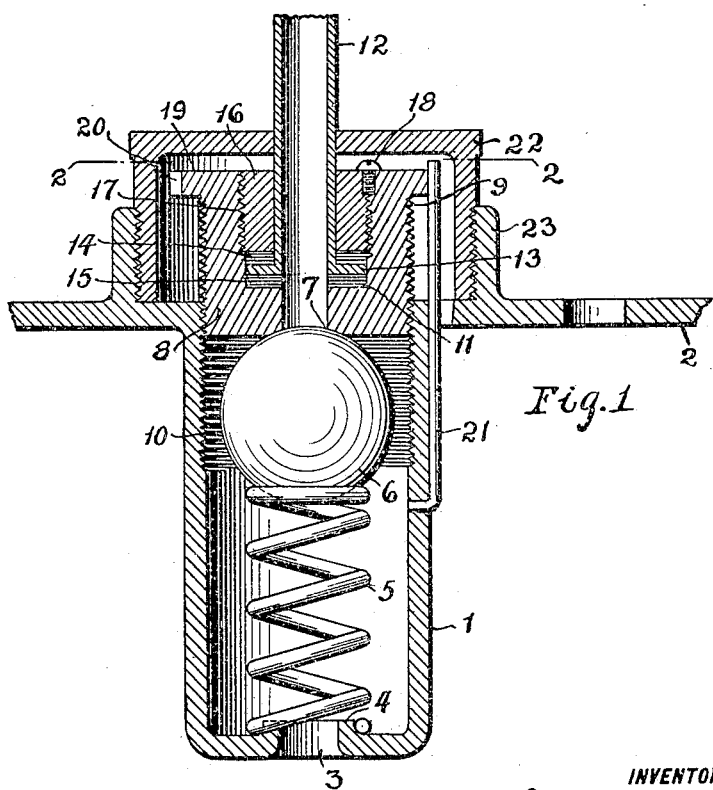
WITNESSES:
INVENTOR
Edgar W. Baird
BY
Chas. N. Butler
ATTORNEY.

No. 793,264. Patented June 27, 1905.

UNITED STATES PATENT OFFICE.

EDGAR W. BAIRD, OF PHILADELPHIA, PENNSYLVANIA, ASSIGNOR TO STANDARD AUTOMATIC LUBRICATOR COMPANY, OF CAMDEN, NEW JERSEY, A CORPORATION OF NEW JERSEY.

AUTOMATIC LUBRICATOR.

SPECIFICATION forming part of Letters Patent No. 793,264, dated June 27, 1905.

Application filed November 30, 1904. Serial No. 234,852.

*To all whom it may concern:*

Be it known that I, EDGAR W. BAIRD, a citizen of the United States, residing at Philadelphia, in the county of Philadelphia and State of Pennsylvania, have invented certain Improvements in Automatic Lubricators, of which the following is a specification.

This invention relates to mechanism for feeding a lubricant at the rate required by the journal-bearing to which it is applied; and it has for its leading object the production of a simple and accessible mechanism, readily constructed, assembled, and dissociated, that will produce increased flexibility and regularity of action.

In the accompanying drawings, Figure 1 represents a vertical sectional view of my invention; and Fig. 2 represents a transverse sectional view thereof, taken on the line 2 2 of Fig. 1.

As shown in the drawings, the casing 1 is integrally connected with and depends from a yoke 2 for supporting it upon a motor-frame or other suitable member in position to deliver to a journal-bearing to be lubricated thereby. Through the bottom of the casing is a port 3, surrounded by a ring 4, which engages a coiled spring 5, resting upon the bottom. A ball 6 is supported by the spring, the top coil of the spring having the form of a ring which provides a suitable seat for the ball. The ball acts as a valve for a port or passage 7 in a bushing or hollow plug 8, which fits in the top of the casing. The plug has the external thread 9 engaging the casing's internal thread 10, by which the position of the plug may be adjusted to regulate the compression of the spring and the pressure of the valve on its seat on the port. The recess 11 in the plug receives the end of a tube 12, having a flange 13 thereon, the flange lying between the gasket 14 on the tube and the gasket 15 in the bottom of the recess.

A bushing or hollow plug 16, sleeved on the tube 12, is engaged within the recess 11 by the screw-threaded connection 17, formed by the internal threads of the plug 8 and the external threads of the plug 16. The plug 16 is screwed into the plug 8 to the extent required for holding the flange 13, which is swiveled thereby, and the plugs are fixed together by a key 18. A ring or flanged top 19 on the plug 8 is provided with the peripheral corrugations 20, which are adapted to be engaged by a spring 21. This spring has its lower end fixed, as by setting it in the casing, its resiliency permitting it to be withdrawn from engagement with the ring when it is desired to move the plug 8 and causing it when released to hold the ring, acting as a latch to secure the plug in the position to which it is adjusted. The top of the casing is covered by a cap 22, which is sleeved on the tube and is screwed into the ring 23 on the yoke 2.

Having described my invention, I claim—

1. A lubricator comprising a casing having a port therein, a coiled spring supported in said casing, a valve supported by said spring, and a device fitted in said casing and having a port therein registering with said valve, said device being adjustable to vary the pressure of said valve on said port, substantially as specified.

2. A lubricator comprising a casing, a coiled spring supported by said casing, a ball resting freely on said coiled spring, and a plug adjustable in said casing and having a port registering with said ball, substantially as specified.

3. A lubricator comprising a casing with an outlet therefrom, a coiled spring supported on the bottom of said casing, a ball-valve supported by said coiled spring, a recessed plug which screws into said casing, said plug having a port which is controlled by said valve, a tube having an end in said recess, and means for holding said tube in said recess, substantially as specified.

4. A lubricator comprising a casing with an outlet therefrom, a coiled spring supported on the bottom of said casing, a ball-valve supported by said spring, a recessed plug adjustable in said casing and having a port registering with said valve, a tube swiveled in said recess, a bushing for holding said tube in said recess, a corrugated ring connected with said plug, and a spring for engaging said corrugations and holding said plug, substantially as specified.

5. A lubricator comprising a casing, a yoke for supporting said casing, a recessed plug having a screw-threaded connection with said casing, a tube having a flanged end in said recess, a bushing for holding said tube in said recess, a ring carried by said yoke, and a cap engaging said ring, substantially as specified.

In testimony whereof I have hereunto set my hand, this 28th day of November, 1904, in the presence of the subscribing witnesses.

EDGAR W. BAIRD.

Witnesses:
　ROBERT JAMES EARLEY,
　UTLEY E. CRANE, Jr.